(12) United States Patent
Lin et al.

(10) Patent No.: US 8,797,765 B2
(45) Date of Patent: Aug. 5, 2014

(54) ANGLE ADJUSTABLE DEVICE AND ELECTRONIC DISPLAY UNIT USING THE SAME

(75) Inventors: Chang-Cheng Lin, Taichung (TW); Ming-Jen Chen, Yunlin County (TW); Kuo-Kuang Liu, Nantou County (TW)

(73) Assignees: Universal Scientific Industrial (Shanghai) Co., Ltd., Shanghai (CN); Universal Global Scientific Industrial Co., Ltd., Nantou County (TW)

( * ) Notice: Subject to any disclaimer, the term of this patent is extended or adjusted under 35 U.S.C. 154(b) by 352 days.

(21) Appl. No.: 13/451,066

(22) Filed: Apr. 19, 2012

(65) Prior Publication Data
US 2013/0044454 A1    Feb. 21, 2013

(30) Foreign Application Priority Data
Aug. 15, 2011    (TW) .............................. 100129112 A

(51) Int. Cl.
*H05K 7/02* (2006.01)
*F16M 11/10* (2006.01)
*G06F 1/16* (2006.01)
*F16M 13/00* (2006.01)

(52) U.S. Cl.
CPC ......... *F16M 11/10* (2013.01); *F16M 2200/024* (2013.01); *G06F 1/1681* (2013.01); *E05Y 2900/606* (2013.01); *F16M 13/00* (2013.01); *Y10S 248/922* (2013.01); *Y10S 248/923* (2013.01)
USPC ...... 361/807; 361/801; 361/802; 361/679.58; 361/679.6; 361/679.43; 248/922; 248/923; 248/397; 248/393; 248/372.1

(58) Field of Classification Search
CPC ............ Y10S 248/919; Y10S 248/917; Y10S 248/92; Y10S 345/905; F16M 11/10; F16M 11/2021; G06F 1/1679; G06F 1/1616; G06F 1/1667
USPC .................... 361/807, 801, 802, 725, 679.55, 361/679.58, 679.6, 679.43, 679.27, 679.2, 361/679.12, 679.06, 679.02; 248/397, 393, 248/372.1, 122.1, 922, 923
See application file for complete search history.

(56) References Cited

U.S. PATENT DOCUMENTS 5,109,572 A * 5/1992 Park ................................. 16/334
6,354,549 B2 * 3/2002 Sweere et al. ............ 248/292.14
(Continued)

FOREIGN PATENT DOCUMENTS

CN        201090602 Y      7/2008

OTHER PUBLICATIONS

China Patent Office, Office Action issued on Apr. 3, 2014.

*Primary Examiner* — Robert J Hoffberg
*Assistant Examiner* — Hung Dang
(74) *Attorney, Agent, or Firm* — Li & Cai Intellectual Property (USA) Office

(57) ABSTRACT

The instant disclosure relates to an angle adjustable device, which includes: a base having a fixing member disposed thereon, where the fixing member has a fixing surface; a switch mechanism having a locking ring, a first gear, and a second gear, while at least one block protrudes from the inner surface of the locking ring, with the first gear having a contact incline slidingly abutted by the block, where the contact incline is defined with a first end and a second end, where the first gear is received by the locking ring and capable of meshing with the second gear; and a rotator having at least one connecting member connected to the second gear. The instant disclosure also discloses an electronic display unit using the same.

16 Claims, 9 Drawing Sheets

(56) References Cited

U.S. PATENT DOCUMENTS

| | | | |
|---|---|---|---|
| 6,354,552 B1 * | 3/2002 | Chiu | 248/422 |
| 6,665,906 B2 * | 12/2003 | Li | 16/330 |
| 6,772,983 B1 * | 8/2004 | Liao et al. | 248/291.1 |
| 7,735,797 B2 * | 6/2010 | Hu | 248/371 |
| 7,913,357 B2 * | 3/2011 | Peng et al. | 16/321 |
| 2004/0216273 A1 * | 11/2004 | Kang et al. | 16/264 |
| 2006/0072964 A1 | 4/2006 | Chen | |
| 2007/0040949 A1 * | 2/2007 | Lin et al. | 348/837 |

\* cited by examiner

ANGLE ADJUSTABLE DEVICE AND ELECTRONIC DISPLAY UNIT USING THE SAME

BACKGROUND OF THE INVENTION

1. Field of the Invention

The instant disclosure relates to an angle adjusting device; more particularly, to an angle adjustable device.

2. Description of Related Art

In recent years, tablet computers, flat screens, Global Positioning System (GPS), Point of Sale (POS), touch-sensitive devices, and handheld electronic devices are increasingly popular among consumers.

One of the conventional means to support these devices and adjust its angular positions is through a hinge assembly. The hinge assembly can provide angular adjustments. However, since different devices have different weights, a different torque is required to rotate each device for angular adjustment. The existing hinge assembly having a conventional pivoting mechanism is not sufficed to accommodate all types of electronic devices having different weights. The prospect of providing a universal angle adjusting device having improved pivoting mechanism capable of supporting different devices is one of the major emphasis today.

SUMMARY OF THE INVENTION

The instant disclosure addresses the above issue by providing an angle adjustable device capable of accommodating electronic devices of different weights. Based on needs of the user, such as for work or entertainment purposes, the angle adjustable device of the instant disclosure can allow the user to view the electronic device at different angles.

The angle adjustable device of the instant disclosure comprises: a base having a fixing member disposed thereon, where the fixing member has a fixing surface with a shaft protruded therefrom; a switch mechanism arranged in close to the fixing member, where the switch mechanism includes a locking ring having at least one block disposed on the inner surface thereof, a first gear movably disposed on the shaft, and a second gear engageable by the first gear, where the first gear having at least one contact incline arranged in correspondence to the block, while the contact incline has a first and second ends, where the distance between the first end and the fixing surface is greater than the distance between the second end and the fixing surface, while the first gear is arranged within the locking ring and the contact incline being slidingly abutted by the block, while the first gear can be meshed to the second gear; and a rotator connected to the switch mechanism, where the rotator includes at least one connecting member connected to the second gear.

The instant disclosure also provides an electronic display unit using the abovementioned angle adjustable device. The electronic display unit comprises: a base having a fixing member disposed thereon, where the fixing member has a fixing surface and a shaft protruded therefrom; a switch mechanism arranged in close to the fixing member, where the switch mechanism includes a locking ring having at least one block disposed on the inner surface thereof, a first gear movably disposed on the shaft, and a second gear engageable by the first gear, with the first gear having at least one contact incline arranged in correspondence to the block, while the contact incline has a first and second ends, where the distance between the first end and the fixing surface is greater than the distance between the second end and the fixing surface, and the first gear being received by the locking ring and the contact incline being slidingly abutted by the block, while the first gear can be meshed to the second gear; a rotator connected to the switch mechanism, where the rotator includes at least one connecting member connected to the second gear and a bracket, and, the bracket connected to the connecting member; and an electronic device supported by the bracket.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

Figure 1:
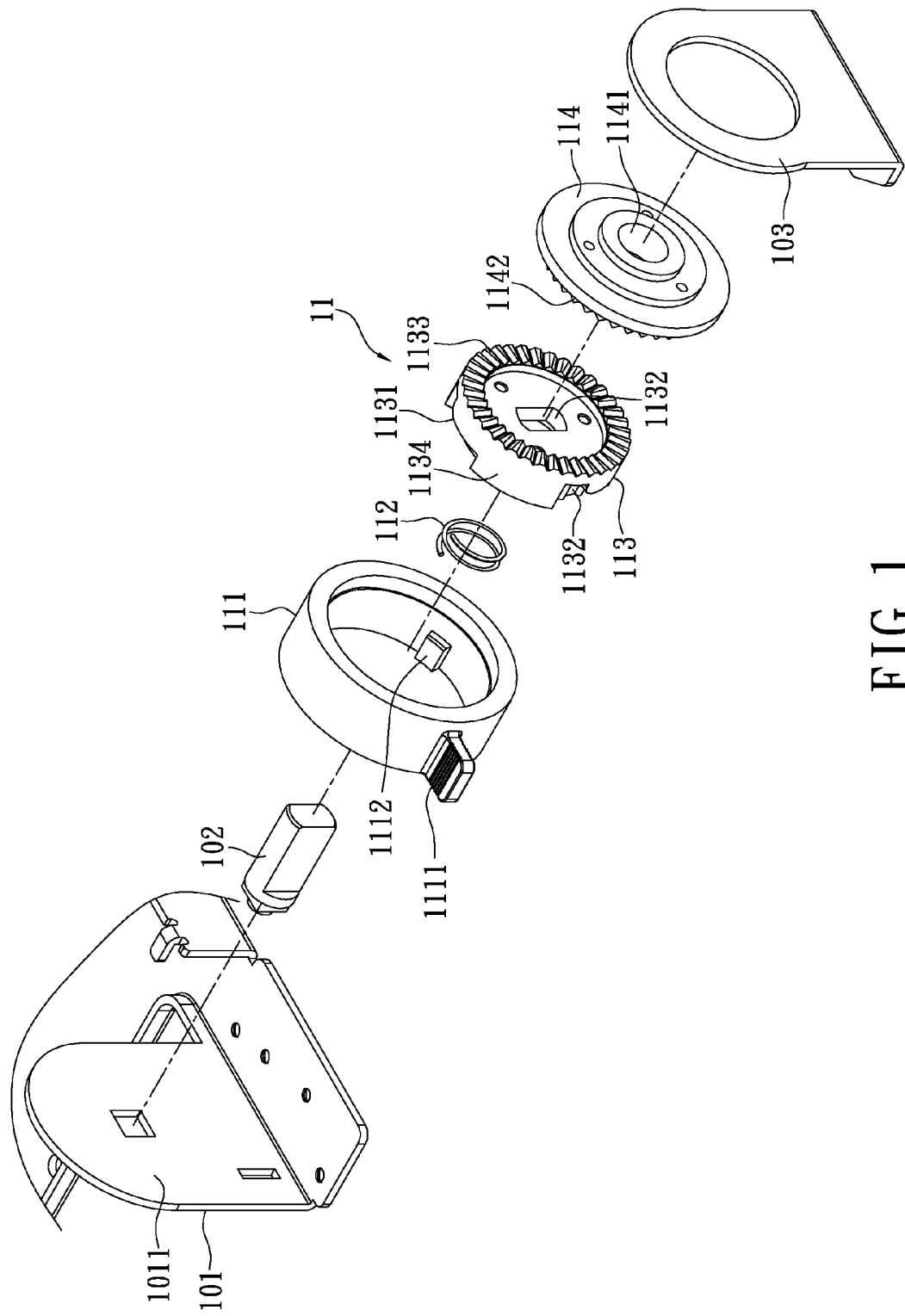
FIG. 1 is an exploded view of a switch mechanism for an angle adjustable device for electronic device of the instant disclosure.

An angle adjustable device for electronic device in accordance with the instant disclosure utilizes a shaft, a pair of gears, and a locking ring to achieve unlimited angular adjustment and capable of fixing the electronic device at a desired angular position. The user can easily adjust the viewing angle of the electronic device and perform other similar operations.

Please refer to FIGS. 1~5, where the angle adjustable device of the instant disclosure comprises a base 10, a switch mechanism 11, and a rotator 12. The rotator 12 can be made to rotate or held in a certain position through the switch mechanism 11.

A fixing member 101 is arranged on the base 10, where the fixing member 101 has a fixing surface 1011 formed thereon. A shaft 102 is arranged protrudingly from the fixing surface 1011. A first gear 113 is movably disposed on the shaft, and a second gear 114 engageable by the first gear 113. The shaft 102 is adapted to a first hole 1132 formed on the first gear 113. Whereas a second hole 1141 is formed centrally on the second gear 114 in alignment with the first hole 1132. The coaxial configuration allows the shaft 102 to project through the first gear 113 and the second gear 114 via the first hole 1132 and the second hole 1141, respectively.

The switch mechanism 11 is arranged in close to the fixing surface 1011. The switch mechanism 11 includes a locking ring 111, the first gear 113, and the second gear 114. As previously mentioned, the first gear 113 is movably disposed on the shaft 102, and the second gear 114 is engageably by the first gear 113, where the first gear 113 is arranged adjacently to the second gear 114. At least one block 1112 is disposed on the inner surface of the locking ring 111. The first gear 113 has a contact incline 1131 formed in correspondence to the block 1112. The contact incline 1131 has a first end 1135 and a second end 1136 formed thereon. The distance between the first end 1135 and the fixing surface 1011 is different from the distance between the second end 1136 and the fixing surface 1011. The first gear 113 is received by the locking ring 111, and the block 1112 abuts slidingly to the contact incline 1131. The first gear 113 can mesh to the second gear 114.

The rotator 12 is fixedly secured to the switch mechanism 11. The rotator 12 includes a connecting member 121, which is connected to the second gear 114. The connecting member 121 can be secured to the second gear 114 by multiple screws 122. A supporter 103 is arranged between the connecting member 121 and the second gear 114. The supporter 103 serves to provide structural support for the switch mechanism 11, the rotator 12, and an electronic device 20.

Figure 2A:
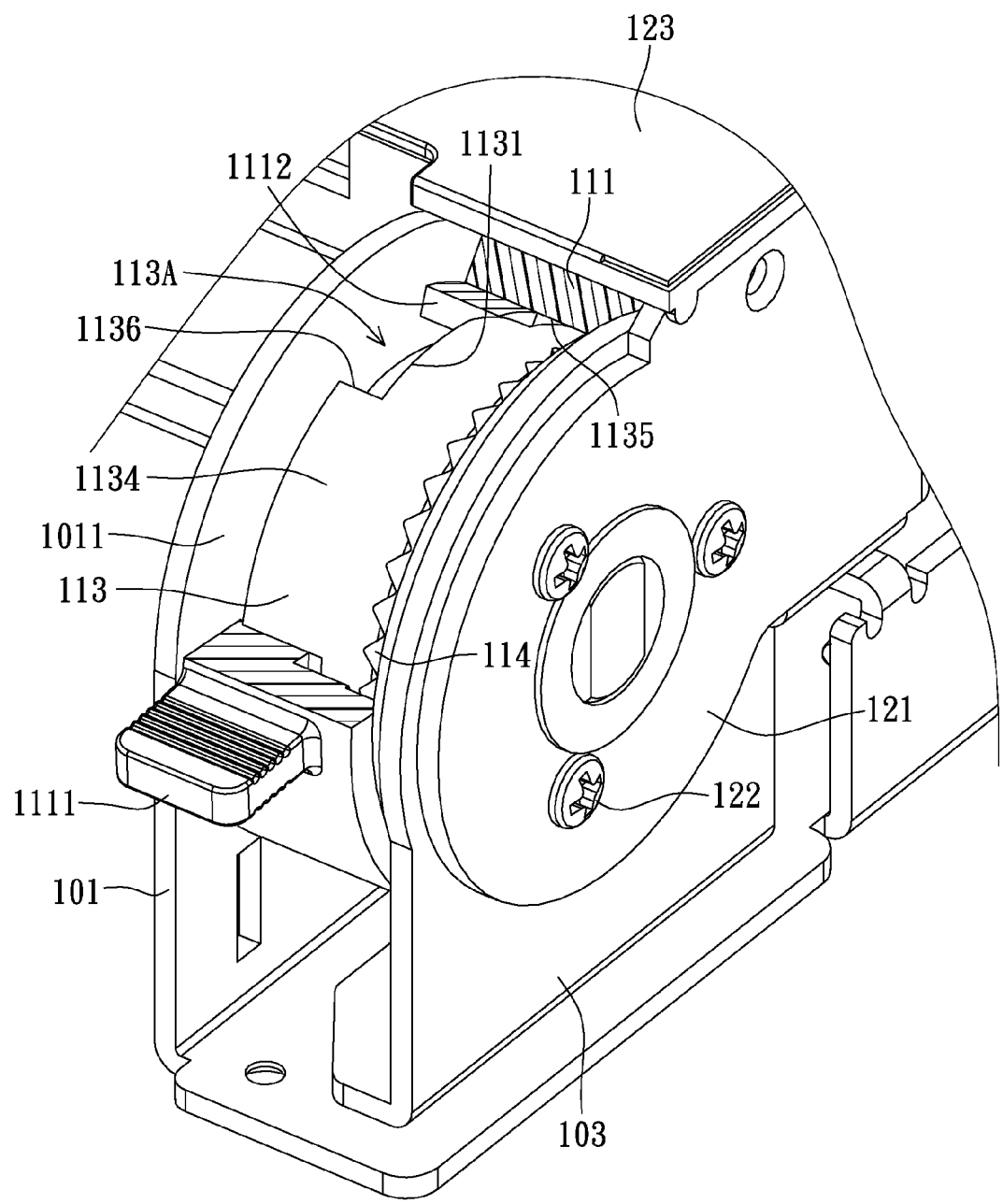
FIG. 2A is a schematic view showing the switch mechanism at a first position before a rotator is rotated for the angle adjustable device of the instant disclosure.
Figure 2B:
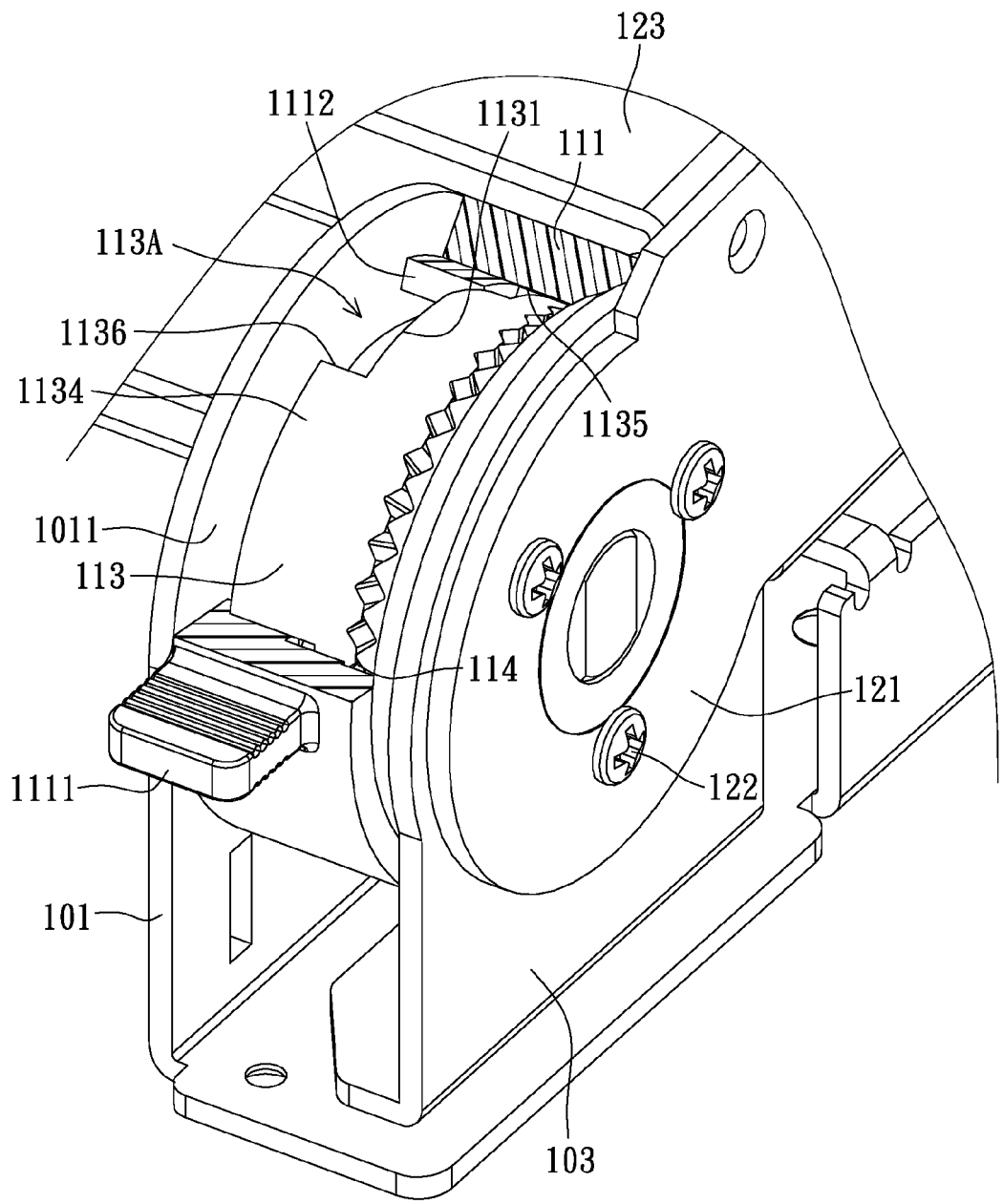
FIG. 2B is a schematic view showing the switch mechanism at the first position while the rotator is being rotated for the angle adjustable device of the instant disclosure.

Please refer to FIGS. 1, 2A, and 2B. The first gear 113 has a first tooth-bearing face 1133, and the second gear 114 has a second tooth-bearing face 1142. The first tooth-bearing face 1133 is arranged adjacently to the second tooth-bearing face 1142. The first gear 113 has an outer surface 1134 in contact with the inner surface of the locking ring 111. At least one chamfered slot 113A is formed between the outer surface 1134 of the first gear 113 and the fixing surface 1011. The contact incline 1131 is received in the chamfered slot 113A. The chamfered slot 113A partially faces the fixing surface 1011. For the present embodiment, three slots 113A are formed between the outer surface 1134 and the fixing surface 1011, however, the number of slots 113A is not restricted. Each slot 113A is bordered by the respective contact incline 1131 of the first gear 113. Correspondingly, three blocks 1112 are arranged on the inner surface of the locking ring 111. Each of the blocks 1112 is slidingly arranged in the respective slot 113A and abutted to the contact incline 1131. The protruding shaft 102 from the fixing surface 1011 connects the first gear 113 and the second gear 114 coaxially in sequence.

The external surface of the locking ring 111 is equipped with a shifter 1111. The shifter 1111 can enable easy manipulation of the locking ring 111, allowing the locking ring 111 to be conveniently turned between a first position and a second position, selectively. At the first position, the rotator 12 is free to rotate. Whereas at the second position, the rotator 12 is locked in a fixed state, unable to rotate. The position of the block 1112 relative to the contact incline 1131 depends on the position of the shifter 1111. In the present embodiment, when the shifter 1111 is turned to the first position, each of the blocks 1112 is arranged adjacent to the first end 1135 of the corresponding contact incline 1131. Enough clearance is allowed between the block 1112 and the contact incline 1131, such that the second tooth-bearing face 1142 can rotate rubbingly against the first tooth-bearing face 1133 in discrete "clicks". In other words, the rotator 12 can rotate about the fixing member 101 through the rotation of the second gear 114. When the shifter 1111 is switched rotatably to the second position, each of the blocks 1112 is moved to abut against the second end 1136 of the corresponding contact incline 1131. At this state, each of the blocks 1112 is tightly pressed against the respective contact incline 1131 without any clearance therebetween. The first tooth-bearing face 1133 is forced to mesh tightly with the second tooth-bearing face 1142, disallowing any rotation by the second gear 114. By locking the second gear member 114, the rotator 12 is restricted to a fixed angular position.

Figure 3:
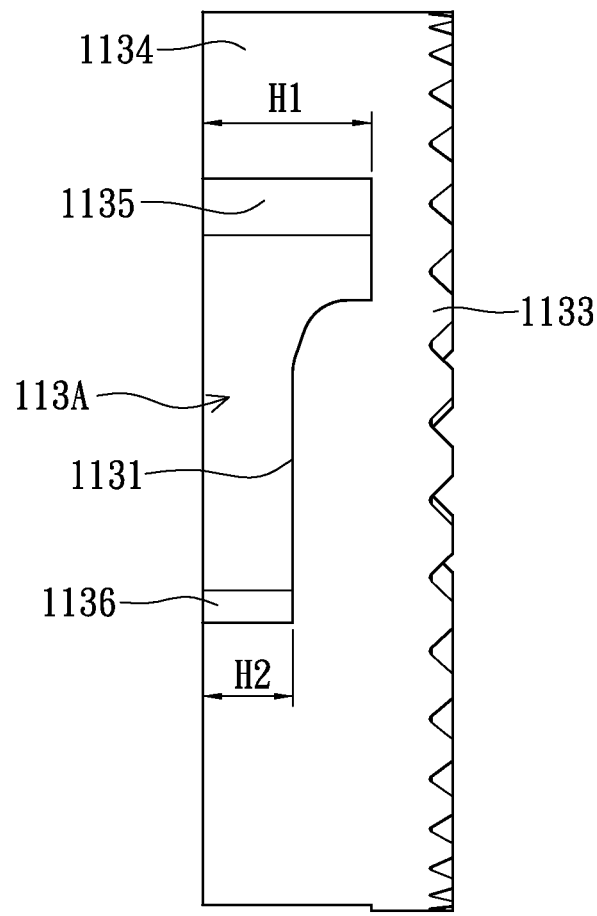
FIG. 3 is a schematic view showing a contact incline of a first gear for the switch mechanism of the angle adjustable device of the instant disclosure.

More detailed explanations are given hereinbelow, in conjunction with FIGS. 1, 2A, 2B, and 3. When the shifter 1111 on the external surface of the locking ring 111 is turned to the first position, each of the blocks 1112 on the inner surface of the locking ring 111 is arranged adjacent to the first end 1135 of the corresponding contact incline 1131 within the respective slot 113A. As illustrated in FIG. 3, the distance between the first end 1135 and the fixing surface 1011 is defined as a first distance H1, whereas the distance between the second end 1136 and the fixing surface 1011 is defined as a second distance H2. Notably, the first distance H1 is greater than the second distance H2. In other words, the area of the outer surface 1134 of the first gear 113 widens from the first end 1135 toward the second end 1136. When each of the blocks 1112 is arranged adjacent to the first end 1135 of the corresponding contact incline 1131, the first gear 113 has enough room to wiggle with respect to the blocks 1112. At such state, the first tooth-bearing face 1133 of the first gear 113 may stay meshed to the second tooth-bearing face 1142 of the second gear 114, albeit in a loosely manner, or being completely disengaged therefrom, in allowing the second gear 114 to rotate. Meanwhile, the connecting member 121 is secured to the non-tooth-bearing side of the second gear 114 and can rotate therewith. In other words, by allowing the second gear 114 to rotate, the connecting member 121 can rotate about the fixing member 101 in achieving unlimited angular adjustment.

Figure 2C:
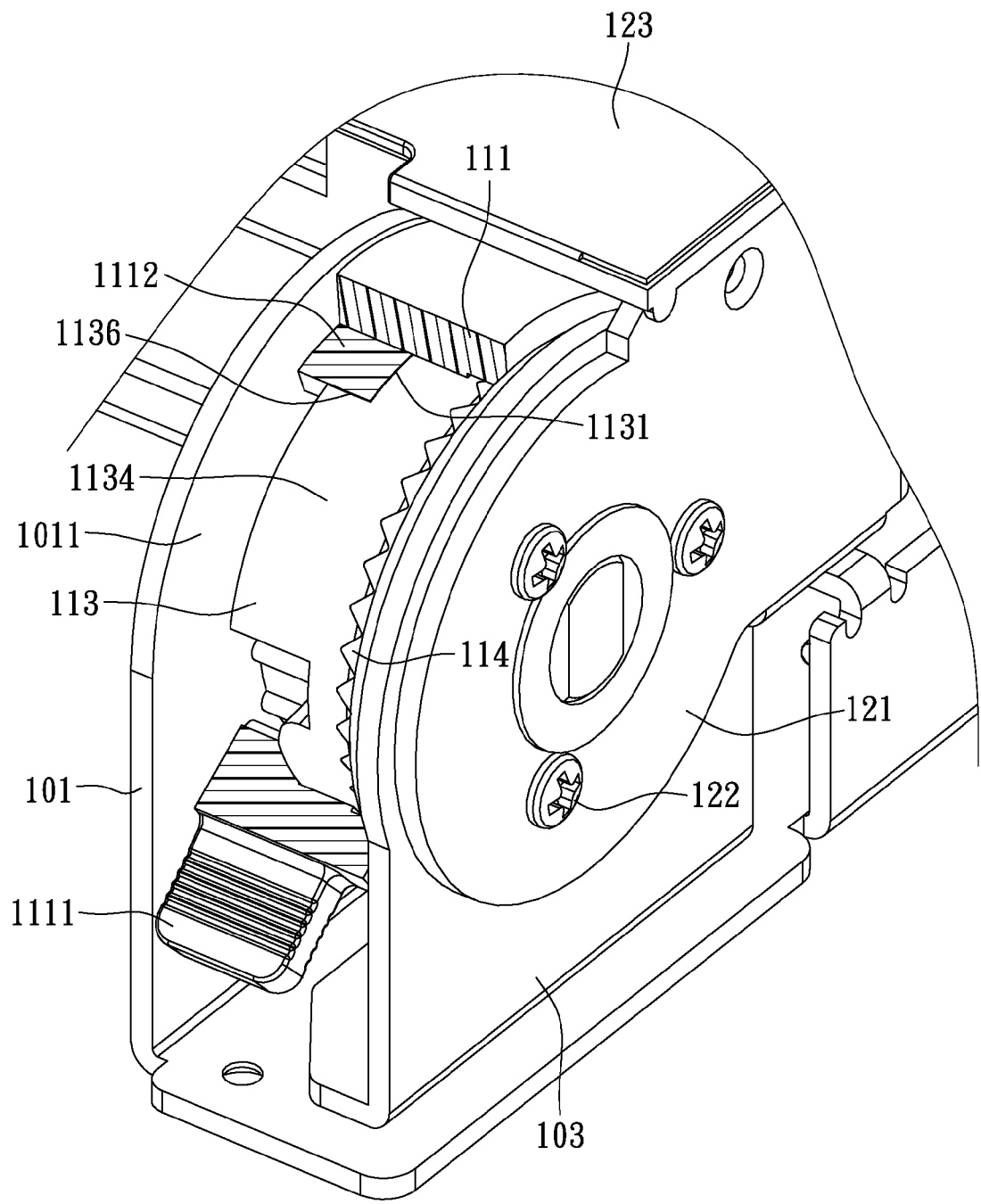
FIG. 2C is a schematic view showing the switch mechanism of the angle adjustable device of the instant disclosure at a second position.

Please refer to FIGS. 1, 2C, and 3. When the shifter 1111 on the external surface of the locking ring 111 is being rotated from the first position toward the second position, since the second distance H2 is less than the first distance H1, each block 1112 on the inner surface of the locking ring 111 would abut slidingly along the respective contact incline 1131. The abutment forces the first gear 113 to move toward the second gear 114. When the shifter 1111 of the locking ring 111 has reached the second position, each of the blocks 1112 is abutted against the second end 1136 of the respective contact incline 1131. At this state, the first tooth-bearing face 1133 of the first gear 113 is meshed tightly to the second tooth-bearing face 1142 of the second gear 114. The mesh disallows the second gear 114 from rotating, and thus fixing the rotator 12 at a particular angular position.

By going the shifter 1111 on the external surface of the locking ring 111 between the first and second positions, the connecting member 121 can be set at a rotating state or a locked state. When the shifter 1111 on the external surface of the locking ring 111 is at the first position, the second gear 114 can be rotated with the connecting member 121. Thereby, the viewing angle of the electronic device 20 carried by the rotator 12 can be adjusted accordingly. When the shifter 1111 on the external surface of the locking ring 111 is pushed to the second position, the second gear 114 is restrained by the first gear 113 from rotating. The locking of the second gear 114 means the connecting member 121 is unable to rotate, thus fixing the electronic device 20 carried by the rotator 12 at a particular angular position. Generally speaking, when the user intends to adjust the angle of the electronic device 20 held by the rotator 12, the shifter 1111 on the external surface of the locking ring 111 can be pushed to the first position. After the adjustment is finished, the user can return the shifter 1111 on the external surface of the locking ring 111 to the second position to lock the rotator 12 at the angled position.

Figure 4A:
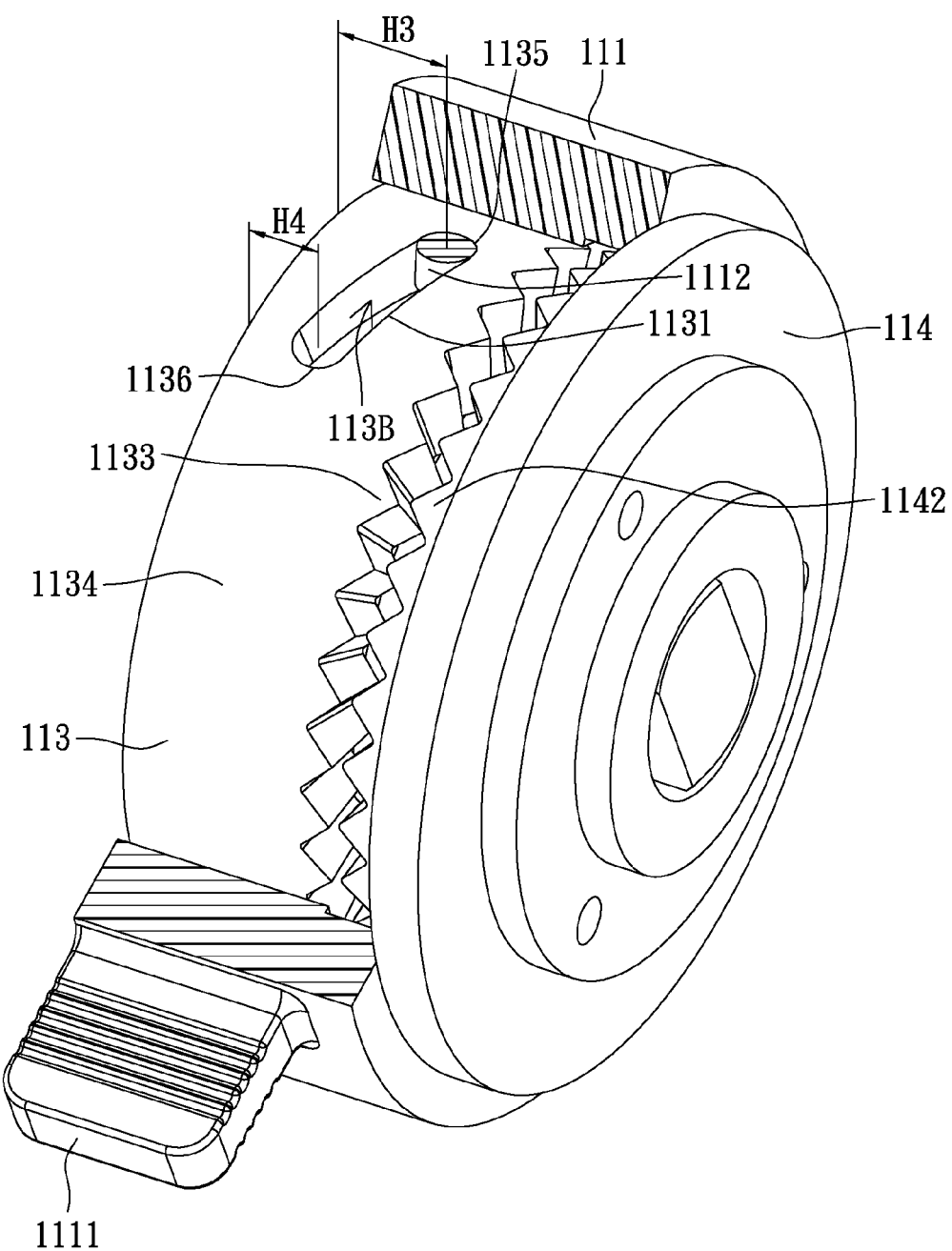
FIG. 4A is a schematic view showing the switch mechanism at a first position for the angle adjustable device of another embodiment of the instant disclosure.
Figure 4B:
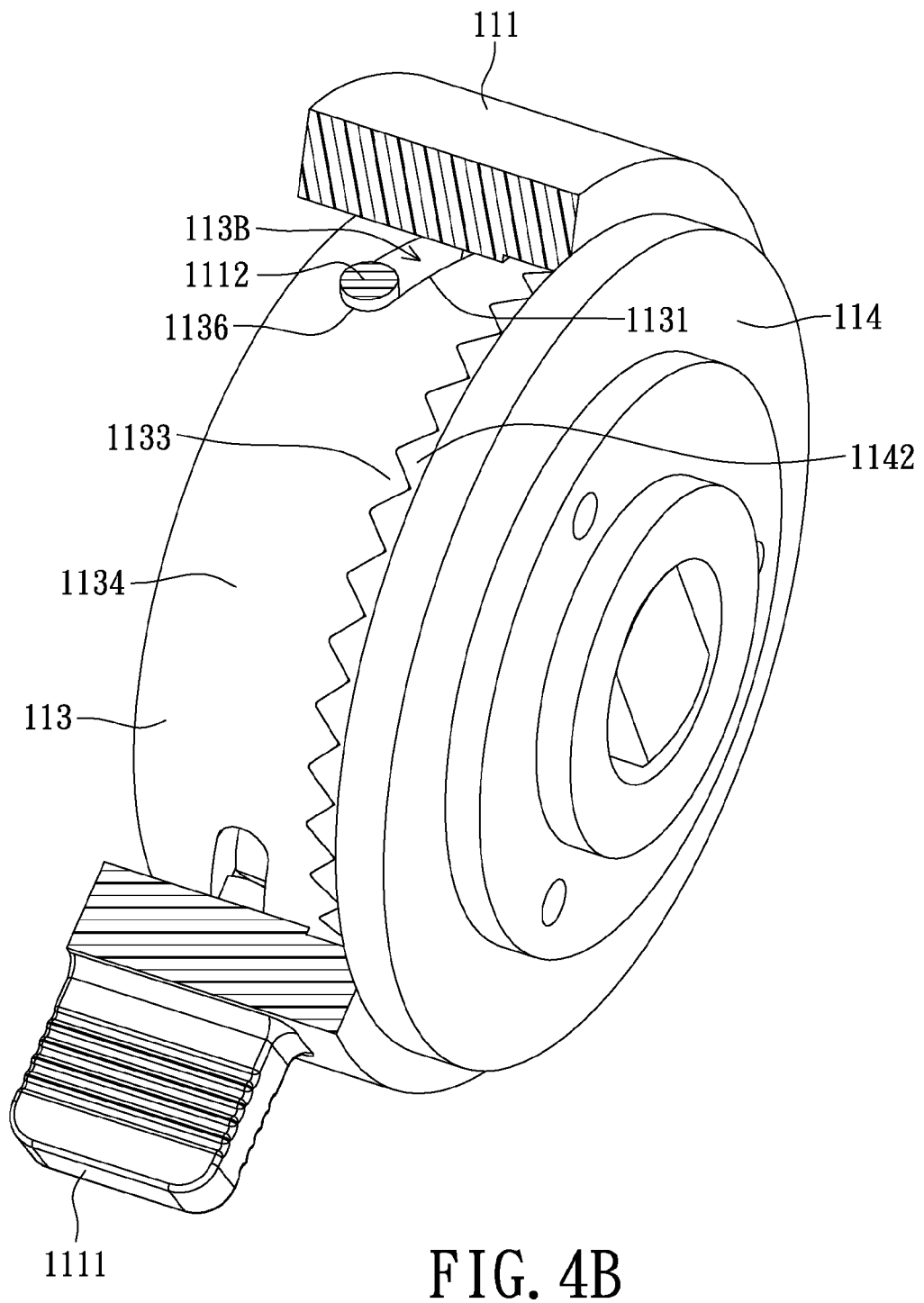
FIG. 4B is a schematic view showing the switch mechanism at a second position for the angle adjustable device of the other embodiment of the instant disclosure.

The instant disclosure further provides another embodiment, as shown in FIGS. 4A and 4B. The difference between this embodiment and the previous embodiment is as follows. The present embodiment utilizes at least one slanted slot 113B formed on the outer surface 1134 of the first gear 113 that establish contact with the inner surface of the locking ring 111, instead of using the chamfered slots 113A on the edge portion of the first gear 113 and bounded by the fixing surface 1011 as in the previous embodiment, the slanted slot 113B does not face the fixing surface 1011. In this embodiment, three slots 113B are formed on the outer surface 1134 of the first gear 113, however, the number of the slots 113B is not restricted. Other technical features such as the base 10, the switch mechanism 11, and the rotator 12 can be referred from the previous embodiment. In this embodiment, three blocks 1112 are disposed on the inner surface of the locking ring 111, with each of the blocks 1112 is received by the respective slot 113B. Each block 1112 is abutted slidingly to the contact incline 1131 of the first gear 113 within the respective slot 113B. The protruding shaft 102 from the fixing surface 1011 connects the first gear 113 and the second gear 114 coaxially in sequence.

As shown in FIGS. 4A and 4B, when the shifter 1111 on the external surface of the locking ring 111 is at the first position, each block 1112 on the inner surface of the locking ring 111 is arranged adjacent to the first end 1135 of the corresponding contact incline 1131 within the respective slot 113B. The distance between the first end 1135 and the edge of the first gear 113 adjacent to the fixing surface 1011, defined herein as a third distance H3, is greater than the distance between the second end 1136 and the edge of the first gear member 113 adjacent to the fixing surface 1011, defined herein as a fourth distance H4. Therefore, when the shifter 1111 is at the first position, the first tooth-bearing face 1133 of the first gear 113 may stay meshed to the second tooth-bearing face 1142 of the second gear 114, albeit in a loosely manner, or being completely disengaged therefrom, in allowing the second gear 114 to rotate for turning the rotator 12.

When the shifter 1111 on the external surface of the locking ring 111 is going from the first position toward the second position, the distance between the contact incline 1131 and the fixing surface 1011 gradually decreases from the first end 1135 toward the second end 1136. So, when the shifter 1111 is being pressed downward, each of the blocks 1112 abuts slidingly along the respective contact incline 1131 and pushes the first gear 113 toward the second gear 114. More specifically, when the shifter 1111 of the locking ring 111 is at the second position, each of the blocks 1112 is abutted to the second end 1136 of the respective contact incline 1131, forcing the first tooth-bearing face 1133 of the first gear 113 to mesh with the second tooth-bearing face 1142 of the second gear 114. At this locked position, the second gear 114 is made unable to rotate, which means the rotator 12 is also fixed at a particular angular position.

For the first embodiment, the switch mechanism 11 can further include an elastic member 112 disposed between the fixing surface 1011 and the first gear 113. The elastic member 112 may be a spring, and further details are given hereinbelow. Please refer back to FIGS. 1, 2A, 2B, and 3. When the shifter 1111 is at the first position, the second tooth-bearing face 1142 can rotate with respect to the first tooth-bearing face 1133. When the second gear 114 is being turned to adjust the angular position of the electronic device 20, the first gear 113 would be pushed off by the second gear 114 toward the fixing surface 1011. More specifically, when one tooth on the second gear 114 pushes past one tooth on the first gear 113, the elastic member 112 arranged on the non-tooth-bearing side of the first gear 113 would push the first gear 113 back toward the second gear 114 as the spring unloads. In other words, the spring pushes the first gear 113 away from the fixing surface 1011 and toward the second tooth-bearing face 1142. Such interaction allows the first tooth-bearing face 1133 to maintain contact with the second tooth-bearing face 1142. This physical contact is based solely on the restoring force of the elastic member 112, and the first tooth-bearing face 1133 is only lightly meshed into the second tooth-bearing face 1142, thus the connecting member 121 is still able to rotate. Thus, when one tooth on the second gear 114 pushes past one tooth on the first gear 113, the second gear 114 would push the first gear 113 toward the fixing surface 1011. When the second gear 114 has stopped turning, the elastic member 112 makes the first gear 113 to lightly re-engage the second gear 114. Furthermore, by lightly meshing the first gear 113 into the second gear 114, the elastic force of the elastic member 112 alone is adequate enough in allowing the electronic device 20 to rotate in discrete "clicks" for unlimited angular adjustments. Thus, when adjusting the angular position of the electronic device 20, the user does not have to hold the electronic device 20 with his/her hand(s) in a continuous manner to prevent it from falling or over-rotating.

Figure 5:
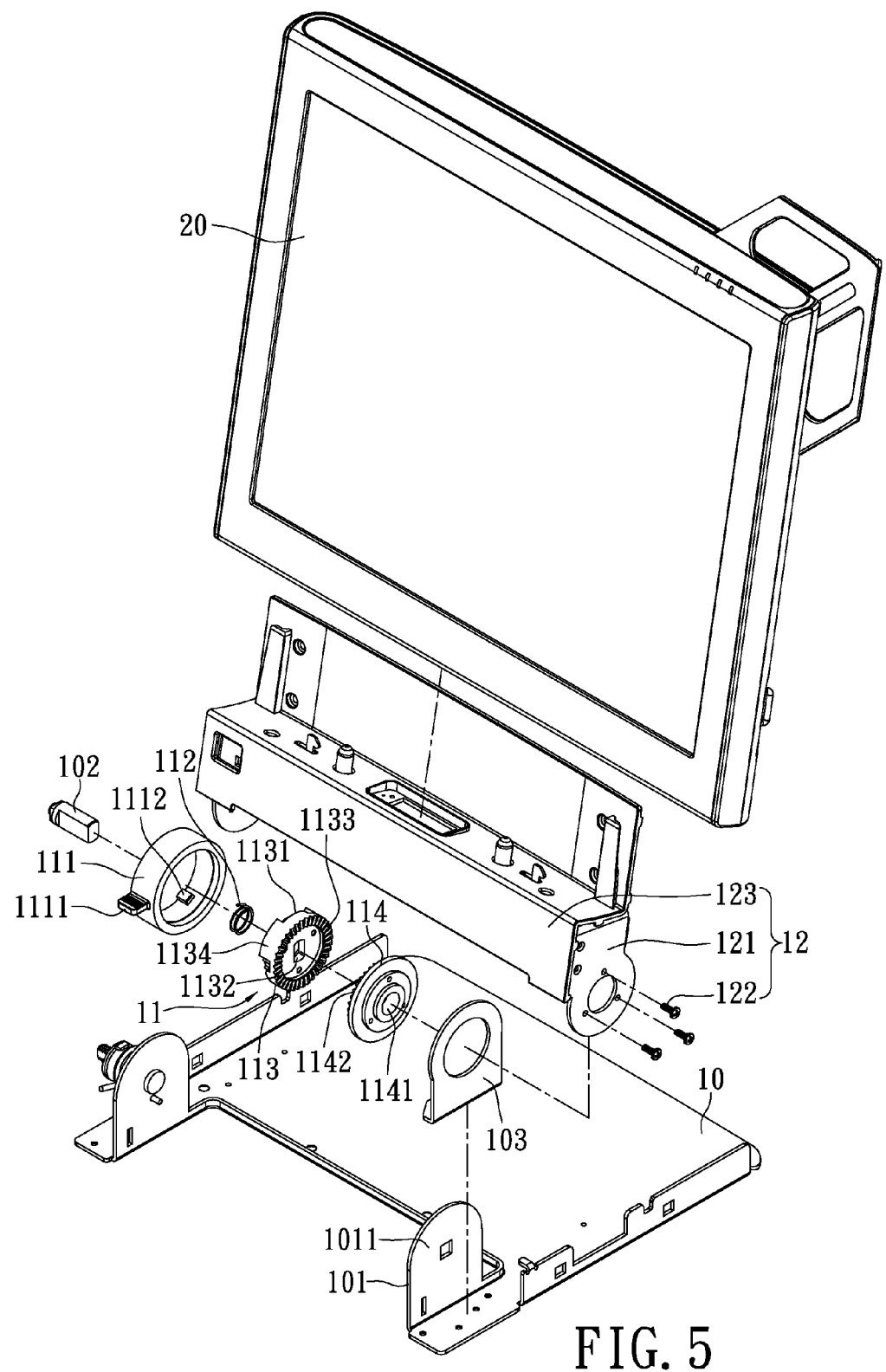
FIG. 5 is an exploded view of an electronic display unit of the instant disclosure.
Figure 6:
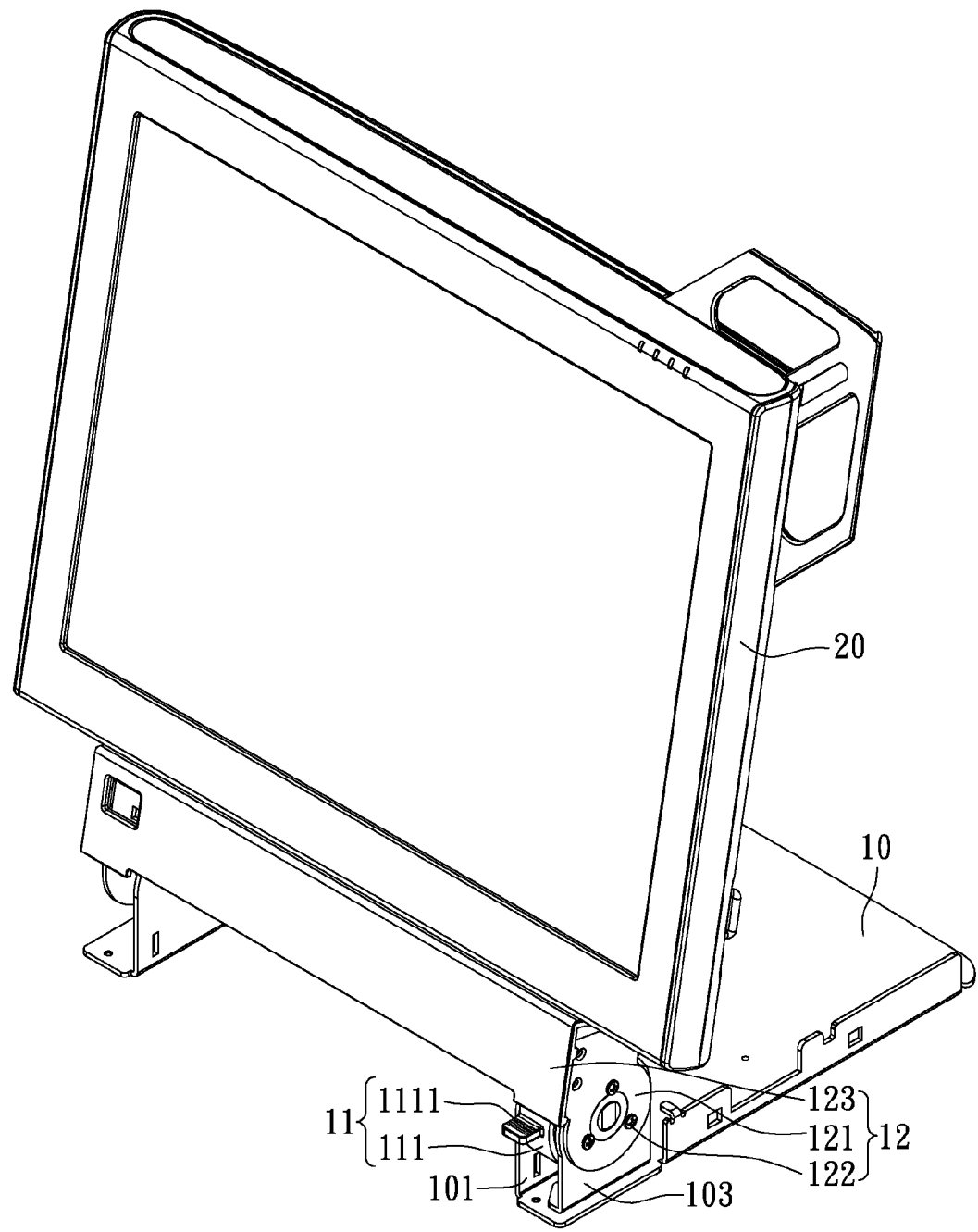
FIG. 6 is an assembled view of the electronic display unit of the instant disclosure.

The instant disclosure also provides an electronic display unit using the angle adjustable device, as shown in FIGS. 5 and 6. The electronic display unit comprises the base 10, the switch mechanism 11, the rotator 12, and the electronic device 20. The electronic device 20 can be any device having visual displaying capability, such as a touch screen, tablet computer, POS, EPOS (Electronic Point of Sale), etc.

Details regarding the base 10 and the switch mechanism 11 can be referred from preceding embodiments. The rotator 12 includes the connecting member 121 and a bracket 123. As previously mentioned, the connecting member 121 is connected to the second gear 114, while the bracket 123 is connected to the connecting member 121. The rotator 12 is pivotal about the fixing member 101 of the base 10, while the electronic device 20 can be secured onto the bracket 123.

When the user intends to adjust the angular position of the electronic device 20, the shifter 1111 can be moved to the first position. At the first position, the second gear 114 can rotate in allowing the rotator 12 to pivot about the fixing member 101 of the base 10 in discrete "clicks". Thereby, the displaying angle of the electronic device 20 can be adjusted. When the user intends to maintain the electronic device 20 at a determined angle, the shifter 1111 can be moved to the second position, such that the second gear 114 is made unable to rotate. The rotator 12 would be fixedly held at the desired angle along with the electronic device 20.

The aforementioned first and second positions of the shifter 1111 are for exemplary purposes, rather than being used to restrict the scope of the instant disclosure.

The gains of the instant disclosure include the following. The gear-gear interaction allows for pivoting and fixing abilities for mounted electronic device. The user is able to fix the electronic device at the desired angular position for viewing, reading, and operating convenience. The use of shaft, gears, and locking ring provide the unlimited selective approach for angular adjustment of the electronic device. The angular position of supported electronic device can be securely fixed, and the same angle adjustable device can be used to pivot different electronic devices having different weights.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An angle adjustable device for electronic device, comprising:
   a base having a fixing member disposed thereon, wherein the fixing member has a fixing surface, and a shaft is protruded from the fixing surface;
   a switch mechanism arranged in close to the fixing member, the switch mechanism comprising a locking ring having at least one block arranged on the inner surface thereof, a first gear movably disposed on the shaft and having at least one contact incline formed in correspondence to the block, the contact incline having a first end and a second end, wherein the distance between the first end and the fixing surface is greater than the distance between the second end and the fixing surface, a second gear facing the first gear and selectively engaged by the first gear; and
   a rotator connected to the switch mechanism, wherein the rotator includes at least one connecting member connected to the second gear.

2. The device of claim 1, wherein the first gear has a first tooth-bearing face and the second gear has a second tooth-bearing face, the first tooth-bearing face arranged adjacently to the second tooth-bearing face, and wherein the first gear has an outer surface having at least one slot formed thereon.

3. The device of claim 2, wherein the slot receives the contact incline and partially faces the fixing surface.

4. The device of claim 3, further comprising a shifter attached to an external surface of the locking ring, wherein the position of the block relative to the contact incline depends on the position of the shifter.

5. The device of claim 1, wherein the switch mechanism further includes an elastic member arranged between the fixing surface and the first gear.

6. The device of claim 2, wherein the slot receives the contact incline and does not face the fixing surface.

7. The device of claim 6, further comprising a shifter attached to an external surface of the locking ring, wherein the position of the block relative to the contact incline depends on the position of the shifter.

8. The device of claim 1, wherein the rotator can be rotated when the block is abutted against the first end, and the rotator is fixed when the block is abutted against the second end.

9. An electronic display unit, comprising:
   a base having a fixing member disposed thereon, wherein the fixing member has a fixing surface, and a shaft is protruded from the fixing surface;
   a switch mechanism arranged in close to the fixing member, wherein the switch mechanism includes a locking ring, a first gear, and a second gear, wherein the locking ring has at least one block formed on the inner surface thereof, wherein the first gear is movably disposed on the shaft and has at least one contact incline formed in correspondence to the block, the contact incline having a first end and a second end, wherein the distance between the first end and the fixing surface is greater than the distance between the second end and the fixing surface, wherein the first gear is selectively engageable with the second gear;
   a rotator connected to the switch mechanism, wherein the rotator includes at least one connecting member connected to the second gear and a bracket; and
   an electronic device disposed on the bracket.

10. The device of claim 9, wherein the first gear has a first tooth-bearing face and the second gear has a second tooth-bearing face, the first tooth-bearing face arranged adjacently to the second tooth-bearing face, wherein the first gear has an outer surface having at least one slot formed thereon.

11. The device of claim 10, wherein the slot receives the contact incline and partially faces the fixing surface.

12. The device of claim 11, further comprising a shifter attached to an external surface of the locking ring, wherein the position of the block relative to the contact incline depends on the position of the shifter.

13. The device of claim 9, wherein the switch mechanism further includes an elastic member arranged between the fixing surface and the first gear.

14. The device of claim 10, wherein the slot receives the contact incline and does not face the fixing surface.

15. The device of claim 14, further comprising a shifter attached to an external surface of the locking ring, wherein the position of the block relative to the contact incline depends on the position of the shifter.

16. The device of claim 9, wherein the rotator can be rotated when the block is abutted against the first end, and the rotator is fixed when the block is abutted against the second end.

* * * * *